United States Patent
Vrbas et al.

(10) Patent No.: US 6,834,501 B1
(45) Date of Patent: Dec. 28, 2004

(54) TURBOCHARGER COMPRESSOR WITH NON-AXISYMMETRIC DESWIRL VANES

(75) Inventors: Gary Vrbas, Wilmington, CA (US); Charles Ney, Lancaster, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/618,515

(22) Filed: Jul. 11, 2003

(51) Int. Cl.[7] ............................................... F02B 35/44
(52) U.S. Cl. ........................ 60/612; 123/562; 415/199.2
(58) Field of Search ............................. 60/612; 123/562; 417/407, 409; 415/199.1, 199.2, 211.2

(56) References Cited

U.S. PATENT DOCUMENTS

| | | |
|---|---|---|
| 2,419,669 A | 4/1947 | Birmann |
| 3,986,791 A | 10/1976 | Paciga et al. |
| 4,251,183 A | 2/1981 | Liu et al. |
| 4,344,737 A | 8/1982 | Liu |
| 4,815,935 A | 3/1989 | Gottemoller |
| 4,968,216 A | * 11/1990 | Anderson et al. ........ 415/199.5 |
| 5,344,285 A | 9/1994 | O'Sullivan et al. |
| 5,722,813 A | 3/1998 | Li et al. |
| 6,062,028 A | 5/2000 | Arnold et al. |
| 6,293,103 B1 | 9/2001 | Gladden |
| 6,301,889 B1 | 10/2001 | Gladden et al. |
| 6,345,503 B1 | 2/2002 | Gladden |
| 6,418,723 B1 | 7/2002 | Gladden |

\* cited by examiner

*Primary Examiner*—Sheldon J Richter
(74) *Attorney, Agent, or Firm*—Ephraim Starr; Chris James (57) ABSTRACT

A compressor includes first-stage and second-stage impellers arranged back-to-back such that fluid is discharged from the first-stage impeller into a generally annular interstage duct that conducts the fluid into the second-stage impeller and the fluid discharged from the second-stage impeller enters into a volute that is arranged generally concentrically within the interstage duct. A discharge duct from the volute passes through the interstage duct at one circumferential location. An array of non-axisymmetric deswirl vanes is arranged upstream of the second-stage impeller. One of the vanes is thick and envelops the discharge duct. The remaining vanes are thinner and are differently configured about the circumference of the vane array to account for the flowfield effects of the thick vane.

25 Claims, 6 Drawing Sheets

TURBOCHARGER COMPRESSOR WITH NON-AXISYMMETRIC DESWIRL VANES

FIELD OF THE INVENTION

The present invention relates to two-stage radial compressors and to turbochargers that include such compressors, and more particularly relates to two-stage radial compressors wherein first-stage and second-stage impellers are arranged in a back-to-back fashion.

BACKGROUND OF THE INVENTION

A two-stage radial compressor with back-to-back impellers is described in U.S. Pat. No. 6,062,028. In the embodiment shown in FIG. 2 of the '028 patent, the pressurized air from the first-stage impeller passes through a diffuser into an interstage duct formed as a generally annular structure. From the interstage duct, the air passes through a row of deswirl vanes that reduce the tangential or swirl component of flow, and then enters the second-stage impeller. The pressurized air from the second-stage impeller goes into a second-stage volute that is concentrically arranged inside the interstage duct. To get the air out of the compressor housing assembly (which includes the interstage duct and second-stage volute), a discharge duct that leads from the second-stage volute out of the housing must penetrate through the interstage duct at one circumferential location of the duct. The presence of the discharge duct in the interstage duct causes the flow entering the deswirl vanes to be non-axisymmetric to a significant extent, because the fluid must flow around the outer surface of the discharge duct. Additionally, a significant amount of flow separation occurs as the flow comes off the discharge duct, and consequently substantial pressure losses are incurred.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 2:
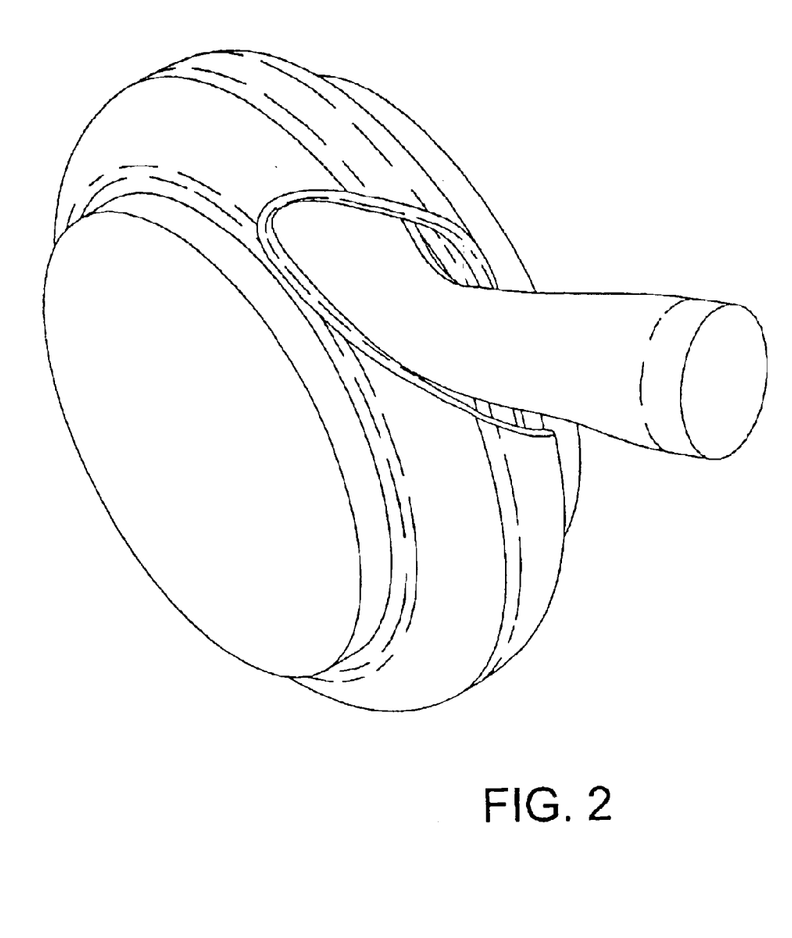
FIG. 2 is a three-dimensional representation of the flow path through the compressor in a "solid" form, illustrating the manner in which the discharge flow from the second-stage volute passes through the area of the interstage duct.

The present invention is applicable to two-stage radial compressors having a back-to-back impeller arrangement such as shown in FIG. 2 of the '028 patent referred to above. It has been found that in such compressors, the presence of the discharge duct within the interstage duct causes the flow entering the deswirl vanes to be highly non-axisymmetric. This results in large part from flow separation that occurs on the discharge duct as the fluid flows around the duct. If steps are not taken to improve the uniformity of the flow entering the second-stage impeller, it has been found that the overall efficiency of the compressor suffers to a significant extent. Furthermore, if steps are not taken to minimize flow separation on the downstream side of the discharge duct, there are resultant pressures losses in the interstage duct that contribute to reduced over-all compressor efficiency.

In accordance with the invention, the uniformity of the flow into the second-stage impeller is improved in part by employing a non-axisymmetric deswirl vane arrangement that takes into account the non-axisymmetric flow conditions entering the vanes as a result of the presence of the discharge duct in the interstage duct. Flow uniformity is further improved by providing one of the deswirl vanes as a relatively thick vane that envelops the discharge duct and acts as an aerodynamic fairing around the duct so that the flow has less tendency to separate, which contributes to reduced pressure losses in the interstage duct.

Figure 1:
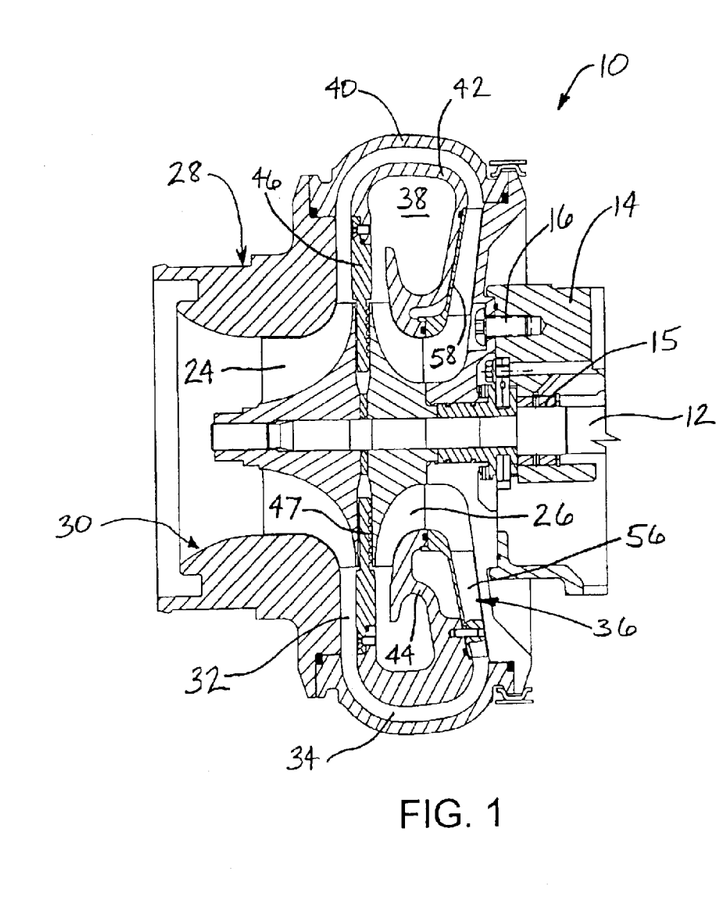
FIG. 1 is a cross-sectional view of a portion of a turbocharger in accordance with one embodiment of the present invention.

FIG. 1 shows a turbocharger 10 having a two-stage compressor in accordance with one embodiment of the invention. The turbocharger 10 includes a rotary shaft 12 on one end of which a turbine wheel (not shown) is mounted. Although not illustrated, it will be understood that the turbine section of the turbocharger 10 includes a turbine housing that defines a turbine volute arranged to direct fluid to the turbine wheel. The turbine housing also defines an outlet. Exhaust gases from an engine (not shown) are fed into the turbine volute. The gases then pass through the turbine and are expanded so that the turbine wheel is rotatably driven, thus rotatably driving the shaft 12. The expanded gases are discharged through the outlet. The turbine can be a radial turbine in which the flow enters the turbine in a generally radially inward direction; however, the invention is not limited to any particular turbine arrangement. Furthermore, the turbocharger could include means other than a turbine for driving the shaft 12, such as an electric motor.

The shaft 12 passes through a center housing 14 of the turbocharger. The center housing connects the turbine housing (not shown) with a compressor housing assembly 28 of the turbocharger as further described below. The center housing contains bearings 15 (only one shown in FIG. 1) for the shaft 12. A rear end of the compressor housing assembly 28 is affixed to the center housing 14 in suitable fashion, such as with threaded fasteners 16.

Mounted on an opposite end of the shaft 12 from the turbine is a two-stage compressor wheel comprising a first-stage impeller 24 and a second-stage impeller 26. Surrounding the compressor wheel is the compressor housing assembly 28. A forward portion of the compressor housing assembly defines a compressor inlet 30 leading into the first-stage impeller 24. As further described below, a rear portion of the compressor housing assembly defines a series of flow paths for leading the pressurized fluid that exits the first-stage impeller into the second-stage impeller and for receiving and discharging the pressurized fluid that exits the second-stage impeller.

More particularly, the rear portion of the compressor housing assembly defines: a first-stage diffuser 32 that receives the fluid discharged from the first-stage impeller and diffuses (i.e., reduces the velocity and hence increases the static pressure of) the fluid; an interstage duct 34 that receives the fluid from the first-stage diffuser 32; an arrangement 36 of deswirl vanes that receive the fluid from the interstage duct and reduce the tangential or "swirl" component of velocity of the fluid, as well as lead the fluid into the second-stage impeller 26; and a second-stage volute 38 that surrounds the second-stage impeller and receives the fluid discharged therefrom. Although not visible in FIG. 1, and as further described below, the compressor housing assembly also defines a discharge duct that connects with the second-stage volute 38 and routes the fluid from the volute out of the compressor for feeding to the engine intake manifold or to a charge air cooler before being fed to the engine intake manifold.

The first-stage impeller 24 and second-stage impeller 26 are mounted back-to-back; that is, the downstream side of the first-stage impeller 24 is nearer the turbine than is the upstream side of the impeller, while the downstream side of the second-stage impeller 26 is farther from the turbine than is the upstream side of the impeller. As a result of this arrangement, the second-stage volute 38 is located generally concentrically within the interstage duct 34. More specifically, the interstage duct 34 is a generally annular structure formed by an outer wall 40 that extends substantially 360 degrees about a central axis of the interstage duct (which axis generally coincides with the axis of the shaft 12, although it does not have to so coincide), and an inner wall 42 that extends substantially 360 degrees about the duct axis and is spaced radially inwardly from the outer wall 40. The interstage duct 34 defined between the inner and outer walls is generally U-shaped in cross-section such that fluid entering the duct is flowing generally radially outwardly (i.e., with little or no axial component, although it does have a substantial swirl component); the duct then turns the fluid so that it is flowing generally axially (again, with substantial swirl component, but with little or no radial component), and finally turns the fluid to a generally radially inward direction (with little or no axial component, but with substantial swirl component) as the fluid enters the deswirl vane arrangement 36. The second-stage volute 38 is located generally concentric with and radially inward of the inner wall 42 of the interstage duct. The volute 38 is delimited at its radially outward side by the inner wall 42, and at its radially inward side by an extension 44 of the wall 42.

The first-stage diffuser 32 is defined between the forward portion of the compressor housing assembly 28 and a stationary seal plate 46. The seal plate separates the diffuser 32 from the second-stage volute 38 and also forms the forward wall of the second-stage diffuser. The seal plate engages the second-stage compressor wheel with a suitable rotating sealing surface 47 to prevent higher-pressure air discharged from the second-stage impeller from leaking into the lower-pressure first-stage diffuser 32. Other types of seal arrangements can be used instead of the arrangement illustrated in FIG. 1.

Figure 3:
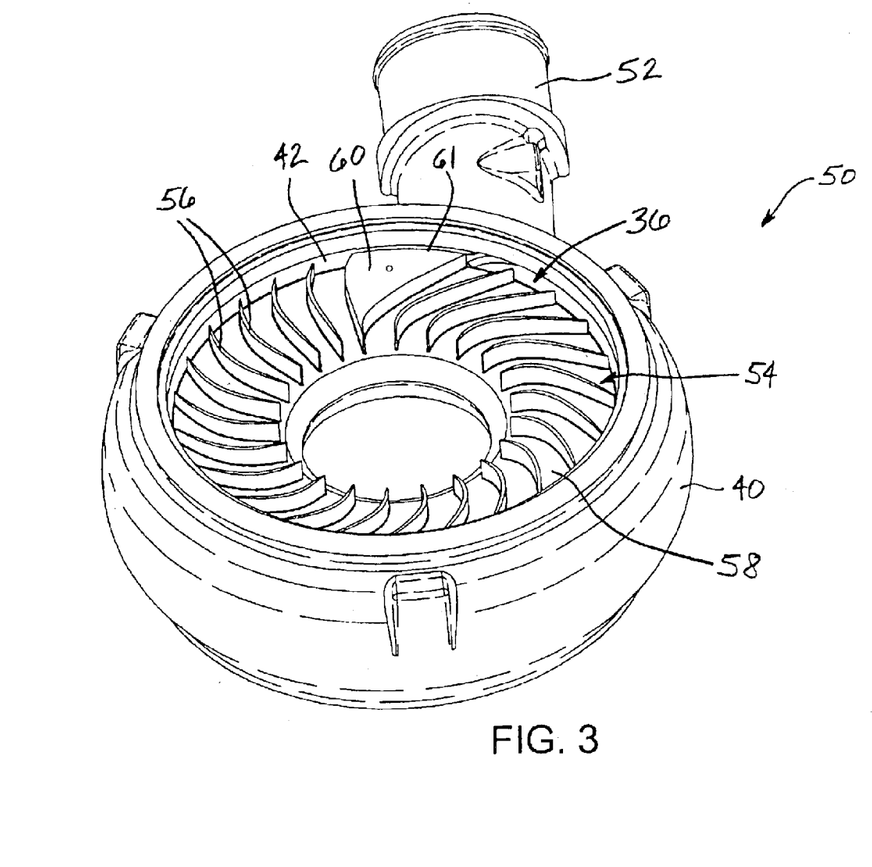
FIG. 3 is a perspective view of a portion of the compressor housing assembly of the turbocharger, showing the ring of deswirl vanes installed in the housing assembly.

With reference to FIG. 3, a duct assembly 50 of the compressor is illustrated. The duct assembly 50 forms a portion of the overall compressor housing assembly 28. More particularly, the duct assembly 50 comprises the elements defining: the interstage duct and second-stage volute, i.e., the outer wall 40, the inner wall 42, and the inner extension 44 (not visible in FIG. 3); the deswirl vane arrangement 36; and a second-stage discharge duct 52 that connects with the second-stage volute 38 (FIG. 1) for discharging air from the volute. The deswirl vane arrangement 36 includes a ring 54 of generally annular form.

Figure 6:
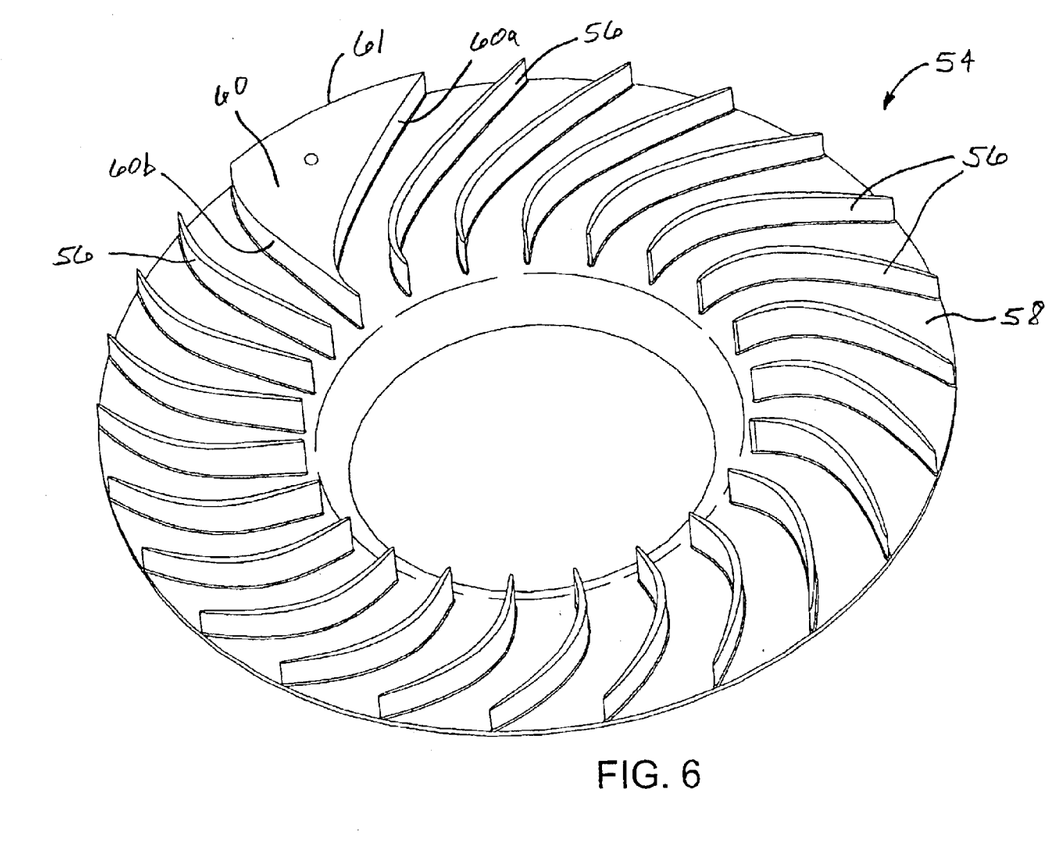
FIG. 6 is a perspective view of a ring of non-axisymmetric deswirl vanes in accordance with one embodiment of the invention.

With reference to FIGS. 3 and 6, the vane ring 54 comprises a plurality of deswirl vanes 56 that are spaced apart about a circumference of the ring. The vanes 56 are oriented generally radially with respect to the axis of the compressor. The vanes are cambered and arranged in such a way that the leading edges of the vanes (at the outer diameter of the ring) are directed generally in the same direction as the swirling flow entering the vanes from the interstage duct, while the trailing edges (at the inner diameter of the ring) are directed substantially in the direction in which it is desired for the flow to exit the vanes, i.e., with little or no swirl component of velocity. The vanes thus reduce the swirl component of velocity before the flow enters the second-stage impeller.

The vanes 56 are affixed to (and can be integrally formed with) a wall 58 of generally annular form that extends generally radially with respect to the compressor axis. The axial extent of each vane 56 is oriented generally perpendicular to the wall 58. As shown in FIG. 1, a radially inner end of the wall 58 engages the inward extension 44 of the wall of the second-stage volute 38 and an O-ring or the like is arranged therebetween for sealing this connection.

The vane ring 54 includes a vane 60 that substantially differs from all of the other vanes 56 and is located, with respect to the circumferential direction of the compressor, in alignment with the discharge duct 52 that passes through the interstage duct. As further explained below, this vane 60 forms the trailing-edge portion of a "thick" vane whose function is to guide the flow in the interstage duct around the discharge duct 52 in as aerodynamically efficient a fashion as possible. The vane 60 has a much greater thickness than that of the other vanes 56 and its maximum thickness occurs at the upstream end 61 of the vane. The thickness of the vane 60 decreases to the downstream end or trailing edge, which has a thickness substantially similar to that of the other vanes. The concave or pressure surface 60a of the vane 60 is configured generally similarly to the convex or suction surface of the vane 56 adjacent thereto. Likewise, the convex or suction surface 60b of the vane 60 is configured generally similarly to the concave or pressure surface of the vane 56 adjacent thereto. In the illustrated embodiment, these two vanes 56 on either side of the vane 60 are configured very differently from each other. In particular, the vane adjacent the pressure surface 60a of the vane 60 has substantially greater camber than the vane adjacent the suction surface 60b of the vane 60, as best seen in FIG. 6. The remaining vanes 56 are configured so that the vane shapes progressively vary from one vane to the next so as to smoothly transition from the highly cambered vane adjacent the pressure surface 60a to the less-cambered vane adjacent the suction surface 60b.

Figure 4:
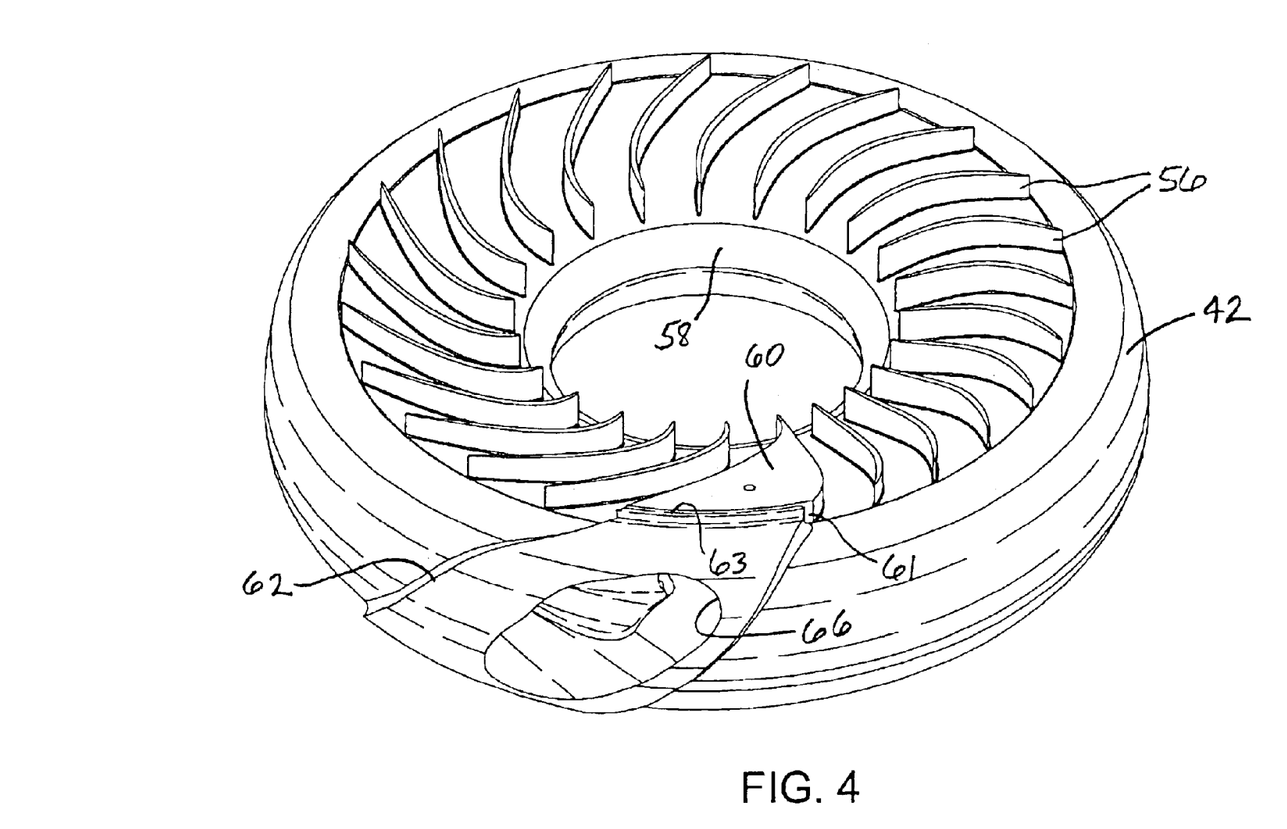
FIG. 4 is a perspective view of the compressor housing shown with the outer wall of the interstage duct removed to reveal the leading-edge portion of a uniquely thick deswirl vane.
Figure 5:
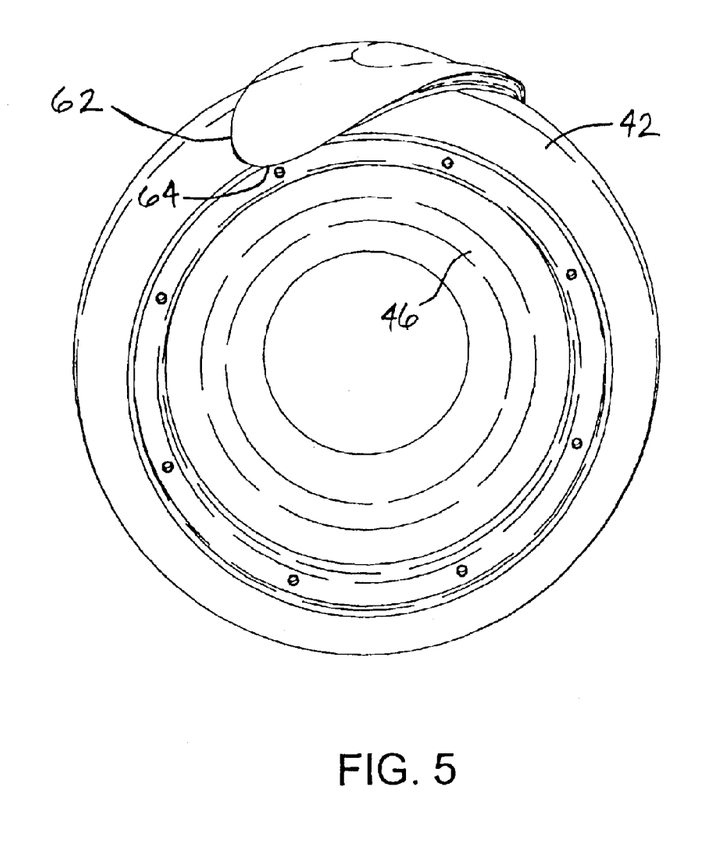
FIG. 5 is a front elevation of the compressor housing with the outer wall of the interstage duct removed to show the most upstream part of the leading-edge portion of the thick deswirl vane.

With reference to FIGS. 4 and 5, the compressor housing assembly is shown with the outer wall of the interstage duct removed to reveal the leading-edge portion of this thick vane and how it interacts with the trailing-edge portion 60. In particular, affixed to (and possibly integrally fabricated with) the inner wall 42 of the interstage duct is a leading-edge vane portion 62. The leading-edge vane portion 62 is configured to mate with the vane 60 of the vane ring so that collectively these structures form a "thick" vane at the location where the discharge duct from the second-stage volute passes through the interstage duct. The downstream end 63 of the leading-edge vane portion 62 has a thickness substantially matching that of the upstream end 61 of the vane 60 and is arranged so that the juncture therebetween is essentially uninterrupted and aerodynamically advantageous (e.g., no large steps in the aerodynamic surface, and substantially no gap between the mating surfaces). The upstream end 64 of the vane portion 62 has a tapered configuration defining the leading edge of the thick vane; the leading edge is located at about the entrance to the U-shaped interstage duct. The leading-edge portion 62 has a passage 66 that passes internally therethrough to allow the discharge duct to pass through this thick vane. Thus, in essence the thick vane envelops the discharge duct so that the fluid flowing through the interstage duct is guided around the discharge duct by the thick vane.

To better visualize the flow, FIG. 2 represents a three-dimensional rendering of the flow areas of the interstage duct, the second-stage volute, and the discharge duct, in "solid" form. It can be seen that the flow in the interstage duct passes around the discharge flow. The discharge flow comes out of the second-stage volute in a generally tangential direction and then turns somewhat radially outwardly and passes through the passage defined by the thick vane.

The thick vane guides the flow around the discharge duct in an aerodynamically more-advantageous way than would be the case if there were no such thick vane. Without the thick vane, and with an axisymmetric ring of deswirl vanes following the discharge duct, the flow would tend to experience substantial separation coming off the discharge duct. This would result in substantial pressure losses immediately downstream of the discharge duct and the flow conditions going into the deswirl vanes would be highly non-axisymmetric. As a result, the aerodynamic performance of neither the interstage duct nor the deswirl vanes would be particularly good, and the flow going into the second-stage impeller would still be non-axisymmetric to a substantial degree. Such non-uniform flow conditions and pressure losses associated with flow separation would tend to impair the aerodynamic efficiency of the compressor to a significant extent.

With the use of a thick vane through which the discharge flow passes and the non-axisymmetric vane arrangement in accordance with the invention, the flow conditions entering the second-stage impeller can be more-uniform and therefore the performance of the compressor can be substantially improved.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A combined interstage duct and second-stage volute for a two-stage radial compressor having first-stage and second-stage impellers arranged back-to-back wherein pressurized fluid from the first-stage impeller flows radially outwardly into the interstage duct and flows from the interstage duct radially inwardly into the second-stage impeller and pressurized fluid from the second-stage impeller flows radially outwardly into the second-stage volute, comprising
a structure defining an outer wall and an inner wall spaced radially inward of the outer wall so as to define the interstage duct between a radially inner surface of the outer wall and a radially outer surface of the inner wall, the inner wall being generally scroll-shaped so as to define the second-stage volute, and a vane integrally formed with at least one of the inner and outer walls and extending between the inner and outer walls in the interstage duct, the vane defining an inner passage therein for passage of a discharge duct from the second-stage volute.

2. A non-axisymmetric deswirl vane ring for a two-stage radial compressor, comprising:
a generally annular disk; and
a plurality of circumferentially spaced deswirl vanes affixed to the disk, the vanes including a relatively thick vane and a plurality of relatively thinner vanes.

3. The non-axisymmetric deswirl vane ring of claim 2, wherein the thick vane defines a concave pressure-side surface and a convex suction-side surface, between which a thickness of the thick vane is defined, and wherein a maximum thickness of the thick vane occurs substantially at an upstream end of the thick vane.

4. The non-axisymmetric deswirl vane ring of claim 2, wherein thinner vanes located nearer to the thick vane differ in configuration from thinner vanes located farther from the thick vane.

5. The non-axisymmetric deswirl vane ring of claim 4, wherein the thinner vanes progressively vary in shape about a circumference of the ring.

6. A two-stage radial compressor, comprising
a compressor wheel mounted on a shaft, the compressor wheel comprising a first-stage impeller and a second-stage impeller, the compressor further comprising an interstage duct that receives pressurized fluid from the first-stage impeller and conducts the fluid to the second-stage impeller, a ring of deswirl vanes located upstream of the second-stage impeller for reducing a swirl component of flow coming out of the interstage duct before said flow enters the second-stage impeller, and a discharge duct that receives pressurized fluid from the second-stage volute and conducts said fluid out of the compressor;
wherein the first- and second-stage impellers are arranged back-to-back, the second-stage volute is disposed generally concentrically within the interstage duct, the discharge duct passes from the second-stage volute through the interstage-duct such that the fluid flowing in the interstage duct must flow around the discharge duct before reaching the second-stage impeller, and wherein the ring of deswirl vanes is non-axisymmetric for taking into account non-axisymmetric flow conditions caused by the presence of the discharge duct.

7. The compressor of claim 6, wherein the ring of deswirl vanes includes a relatively thick vane that envelops the discharge duct, the thick vane having an outer surface exposed to the fluid flowing through the ring of deswirl vanes and having an internal passage through which the discharge duct passes.

8. The compressor of claim 7, wherein the ring of deswirl vanes includes a plurality of additional relatively thinner vanes spaced apart about a circumference of the ring, vanes nearer to the thick vane differing in configuration from vanes that are farther from the thick vane.

9. The compressor of claim 8, wherein the additional vanes and a trailing-edge portion of the thick vane are integrally formed together as a one-piece ring, and wherein the thick vane further includes a leading-edge portion formed separately from the ring and mated with the trailing-edge portion.

10. A turbocharger, comprising:

a turbine mounted on a rotatable shaft for rotation about an axis of the shaft;

a compressor comprising a compressor wheel mounted on the shaft, the compressor wheel comprising a first-stage impeller and a second-stage impeller, the compressor further comprising an interstage duct that receives pressurized fluid from the first-stage impeller and conducts the fluid to the second-stage impeller, a ring of deswirl vanes located upstream of the second-stage impeller for reducing a swirl component of flow coming out of the interstage duct before said flow enters the second-stage impeller, and a discharge duct that receives pressurized fluid from the second-stage volute and conducts said fluid out of the compressor;

wherein the first- and second-stage impellers are arranged back-to-back, the second-stage volute is disposed generally concentrically within the interstage duct, the discharge duct passes from the second-stage volute through the interstage duct such that the fluid flowing in the interstage duct must flow around the discharge duct before reaching the second-stage impeller, and wherein the ring of deswirl vanes is non-axisymmetric for taking into account non-axisymmetric flow conditions caused by the presence of the discharge duct.

11. The turbocharger of claim 10, wherein the compressor further comprises a first-stage diffuser between the first-stage impeller and the interstage duct for diffusing the fluid.

12. The turbocharger of claim 11, further comprising a stationary seal plate separating the first-stage diffuser from the second-stage volute, a rotating seal being arranged between the seal plate and the compressor wheel.

13. The turbocharger of claim 10, wherein the ring of deswirl vanes includes a relatively thick vane that envelops the discharge duct, the thick vane having an outer surface exposed to the fluid flowing through the ring of deswirl vanes and having an internal passage through which the discharge duct passes.

14. The turbocharger of claim 13, wherein the ring of deswirl vanes includes a plurality of additional relatively thinner vanes spaced apart about a circumference of the ring, vanes nearer to the thick vane differing in configuration from vanes that are farther from the thick vane.

15. The turbocharger of claim 14, wherein the additional vanes progressively vary in configuration about the circumference of the ring.

16. The turbocharger of claim 14, wherein the additional vanes and a trailing-edge portion of the thick vane are integrally formed together as a one-piece ring, and wherein the thick vane further includes a leading-edge portion formed separately from the ring and mated with the trailing-edge portion.

17. The turbocharger of claim 16, wherein the leading-edge portion of the thick vane has a first thickness at a downstream end thereof and the trailing-edge portion of the thick vane has a maximum thickness substantially at an upstream end thereof that substantially matches said first thickness, the upstream end of the trailing-edge portion mating with the downstream end of the leading-edge portion.

18. The turbocharger of claim 16, wherein the internal passage of the thick vane is formed in the leading-edge portion of the thick vane.

19. The turbocharger of claim 18, wherein the leading-edge portion of the thick vane is formed integrally with a housing of the compressor, the housing also forming the interstage duct.

20. A turbocharger, comprising:

a turbine mounted on a rotatable shaft for rotation about an axis of the shaft;

a compressor comprising a first-stage impeller mounted on the shaft, a second-stage impeller mounted on the shaft, an interstage duct that receives pressurized fluid from the first-stage impeller and conducts the fluid to the second-stage impeller, a second-stage volute that receives pressurized fluid from the second-stage impeller, a plurality of circumferentially spaced deswirl vanes located upstream of the second-stage impeller for reducing a swirl component of flow coming out of the interstage duct before said flow enters the second-stage impeller, and a discharge duct that receives pressurized fluid from the second-stage volute and conducts said fluid out of the compressor;

the first- and second-stage impellers being arranged back-to-back, the second-stage volute disposed generally concentrically within the interstage duct, the discharge duct passing from the second-stage volute through the interstage duct such that the fluid flowing in the interstage duct must flow around the discharge duct before reaching the second-stage impeller; and the deswirl vanes comprising a relatively thick vane that envelops the discharge duct and guides the fluid around the discharge duct, and a plurality of relatively thinner vanes circumferentially spaced on opposite sides of the thick vane, the vanes continuously varying in configuration about a circumference.

21. The turbocharger of claim 20, wherein the interstage duct is generally annular in configuration and a leading-edge portion of the relatively thick vane occupies the interstage duct and extends between a radially inner wall of the interstage duct and a radially outer wall of the interstage duct.

22. The turbocharger of claim 21, wherein the leading-edge portion of the thick vane is formed integrally with at least one wall of the interstage duct.

23. The turbocharger of claim 21, wherein the leading-edge portion of the thick vane defines an inner passage through which the discharge duct passes.

24. The turbocharger of claim 23, wherein a trailing-edge portion of the thick vane is formed separately from the leading-edge portion.

25. The turbocharger of claim 24, wherein the trailing-edge portion is formed along with the relatively thinner vanes as an integral ring.

* * * * *